US007789297B2

(12) United States Patent
Birkeland et al.

(10) Patent No.: US 7,789,297 B2
(45) Date of Patent: Sep. 7, 2010

(54) STORED-VALUE CARD WITH CHEMICAL LUMINESCENCE

(75) Inventors: Matthew L. Birkeland, Plymouth, MN (US); Erin M. Borkowski, Andover, MN (US); Ted C. Halbur, Lino Lakes, MN (US); David B. Smith, Falcon Heights, MN (US); Primoz Samardzija, Marina del Rey, CA (US); John Dwyer, Oak Park Heights, MN (US); Dennis R. Smith, Minnetonka, MN (US)

(73) Assignee: Target Brands, Inc., Minneapolis, MN (US)

( * ) Notice: Subject to any disclaimer, the term of this patent is extended or adjusted under 35 U.S.C. 154(b) by 940 days.

(21) Appl. No.: 11/510,264

(22) Filed: Aug. 25, 2006

(65) Prior Publication Data

US 2008/0217401 A1 Sep. 11, 2008

(51) Int. Cl.
*G06K 5/00* (2006.01)
*G06F 17/00* (2006.01)
*G06F 19/00* (2006.01)

(52) U.S. Cl. ........................ 235/380; 235/375; 235/379

(58) Field of Classification Search .............. 40/124.02, 40/124.06

See application file for complete search history.

(56) References Cited

U.S. PATENT DOCUMENTS 3,539,794 A 11/1970 Rauhut et al.
3,576,987 A * 5/1971 Voight et al. .................. 362/34
3,698,295 A 10/1972 Van Swearingen
4,055,014 A 10/1977 Schmidt et al.
5,121,302 A 6/1992 Bay et al.
5,190,367 A * 3/1993 Aoki .......................... 362/34
5,226,710 A 7/1993 Giglia et al.
5,279,058 A 1/1994 Kohn
5,557,869 A 9/1996 Douglas
5,997,992 A 12/1999 Paul
6,138,913 A 10/2000 Cyr et al.
6,503,605 B1 1/2003 Paul-Lieberman
6,748,681 B1 * 6/2004 Dorney ......................... 40/1.5
6,758,572 B2 7/2004 Ladyjensky
6,908,206 B1 6/2005 Pinciaro
7,520,425 B2 * 4/2009 Clegg ......................... 235/380
2002/0117243 A1 * 8/2002 Koren ........................ 150/147
2002/0143697 A1 10/2002 Gotfried
2004/0238625 A1 12/2004 Walker et al.
2005/0242193 A1 * 11/2005 Smith et al. ................. 235/487
2007/0194128 A1 8/2007 Coe et al.

OTHER PUBLICATIONS

Halbur, Ted C., et al., "Stored-Value Card with Housed Object," U.S. Appl. No. 11/404,584, filed Apr. 14, 2006.
Lindahl, Kim O., et al., "Stored-Value Card With Bubble Wand," U.S. Appl. No. 11/404,367, filed Apr. 14, 2006.

* cited by examiner

*Primary Examiner*—Michael G Lee
*Assistant Examiner*—Matthew Mikels
(74) *Attorney, Agent, or Firm*—Griffths & Seaton PLLC

(57) ABSTRACT

A stored-value card includes a housing and a glow article. The housing includes an account identifier adapted to link the stored-value card to a financial account or a financial record. The glow article is enclosed within the housing and is configured to be selectively removed from the housing and manipulated to initiate chemical luminescence of the glow article. Stored-value card assemblies, methods of promoting sales of stored-value cards, methods of using a stored-value card and other embodiments are also disclosed.

22 Claims, 9 Drawing Sheets

STORED-VALUE CARD WITH CHEMICAL LUMINESCENCE

BACKGROUND OF THE INVENTION

Stored-value cards and other financial transaction cards come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Stored-value cards provide a number of advantages to both the consumer and the retailer.

SUMMARY OF THE INVENTION

One aspect of the present invention relates to a stored-value card including a housing and a glow article. The housing includes an account identifier adapted to link the stored-value card to a financial account or a financial record. The glow article is enclosed within the housing and is configured to be selectively removed from the housing and manipulated to initiate chemical luminescence of the glow article. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A gift card or other stored-value card is adapted for making purchases of goods and/or services at, e.g., a retail store or website. According to one embodiment, an original consumer buys a stored-value card to give a recipient who in turn is able to use the stored-value card at a retail store or setting to pay for the goods and/or services. A stored-value card, according to embodiments of the present invention, provides the consumer and recipient with extra amusement in addition to the ability to pay for goods and/or services with the stored-value card.

In particular, the stored-value card presents the original consumer or a recipient with a glow article contained in an outer housing. During use, the glow article can be bent, cracked, or otherwise manipulated to activate chemical luminescent components contained therein, which illuminates the glow article, thereby amusing the consumer or recipient as well as any other observers. In one embodiment, the additional amusing aspect of the stored-value card promotes the sale and/or loading of the stored-value card by potential consumers and/or bearers of the stored-value card.

Figure 1A:
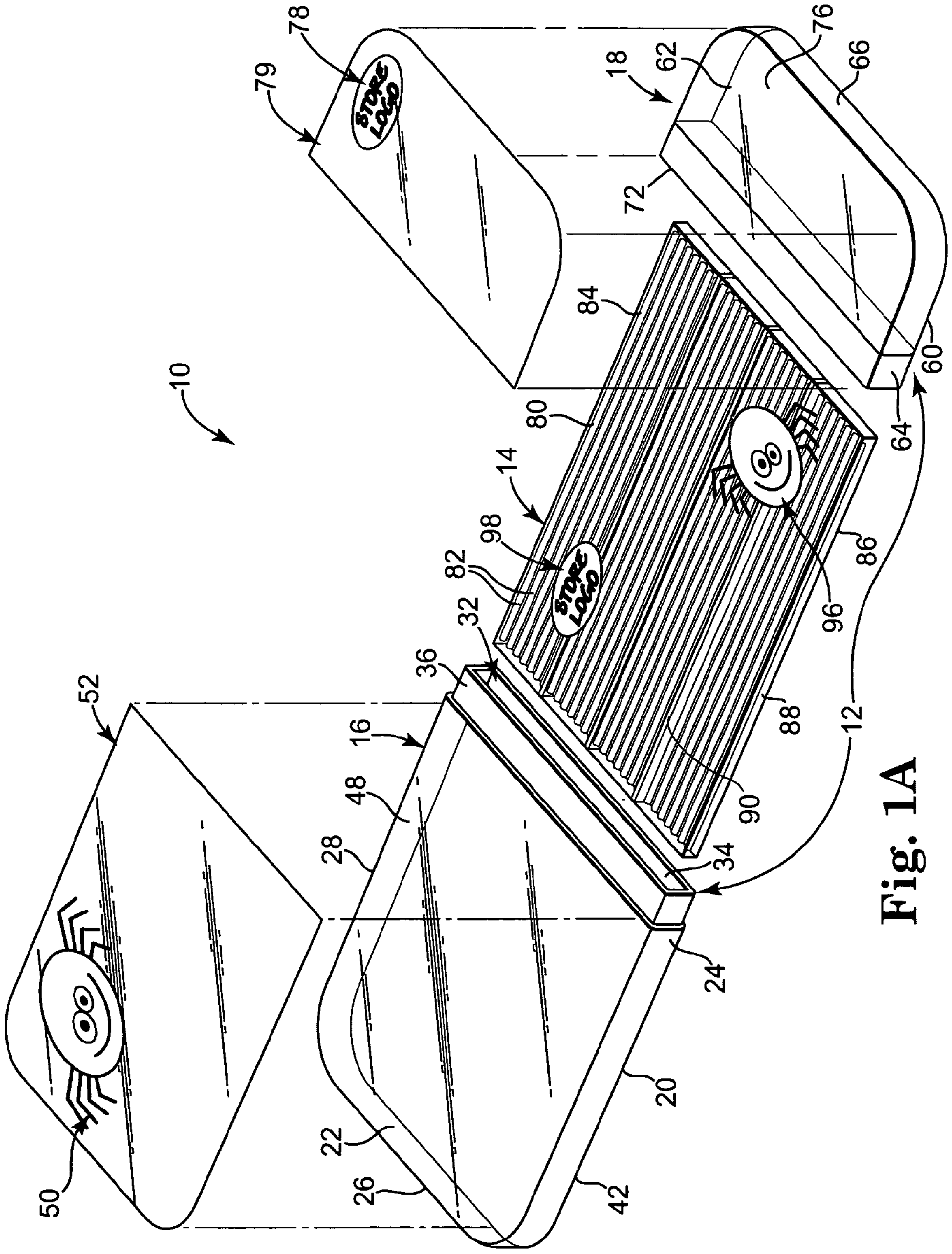
FIG. 1A is an exploded, right side, perspective view illustrating one embodiment of a stored-value card, according to the present invention.
Figure 1B:
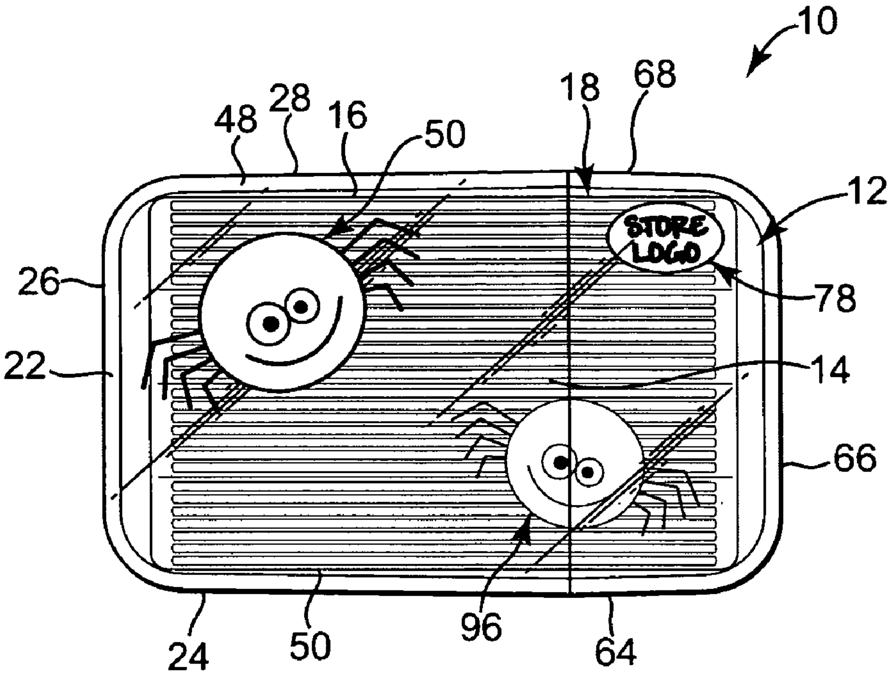
FIG. 1B is a front view illustrating the stored-value card of FIG. 1A.
Figure 1C:
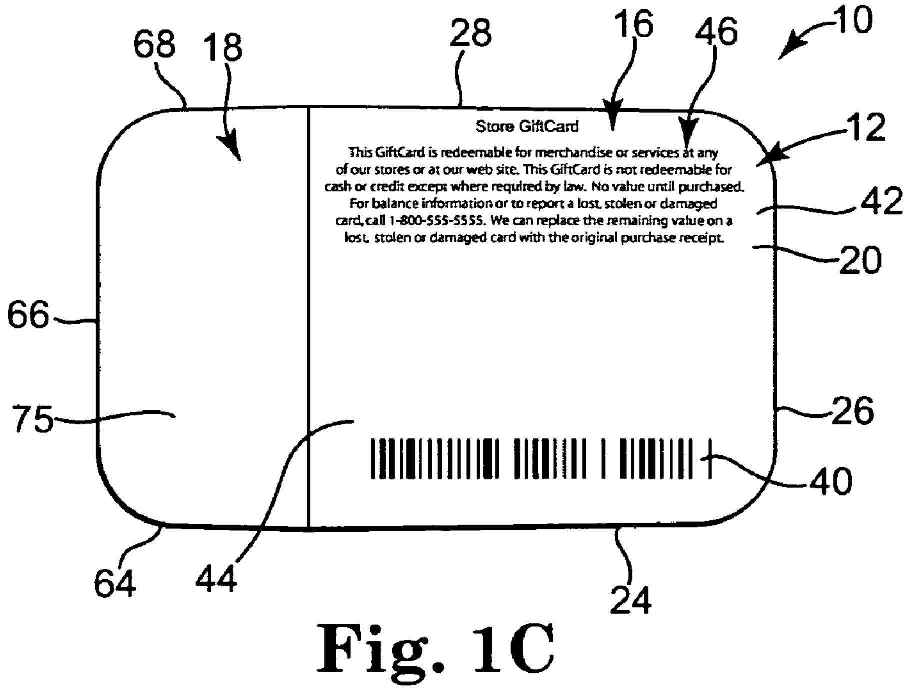
FIG. 1C is a back view illustrating the stored-value card of FIG. 1A.

Turning to the figures, FIGS. 1A-1C illustrate one embodiment of a stored-value card 10 according to the present invention. The stored-value card 10 includes a housing or enclosure 12 and a glow article 14. Housing 12 is configured to selectively house glow article 14. In one embodiment, housing 12 includes a first housing member 16 and a second housing member 18 configured to be selectively coupled with first housing member 16.

First housing member 16 includes first and second major panels 20 and 22 spaced from and extending substantially parallel with one another. In one embodiment, major panels 20 and 22 are each substantially planar and are similarly sized and shaped. In one embodiment, each major panel 20 and 22 is substantially rectangular. Side walls 24, 26, and 28 each extend from a different side of and between major panels 20 and 22. More specifically, where major panels 20 and 22 are substantially rectangular, first side wall 24 extends substantially parallel to third side wall 28. Second side wall 26 extends between first and third side walls 24 and 28. In view of this configuration, first housing member 16 defines a chamber 32, which is substantially enclosed except for an opening 34 formed opposite second side wall 26.

In one embodiment, a flange 36 extends around opening 34. In particular, flange 36 extends from ends of first and second major panel 20 and 22 and first and third side walls 24 and 28 that are opposite second side wall 26. Flange 36 extends substantially parallel to, but inwardly offset from each of major panels 20 and 22 and side walls 24 and 28, away from second side wall 26.

Figure 2:
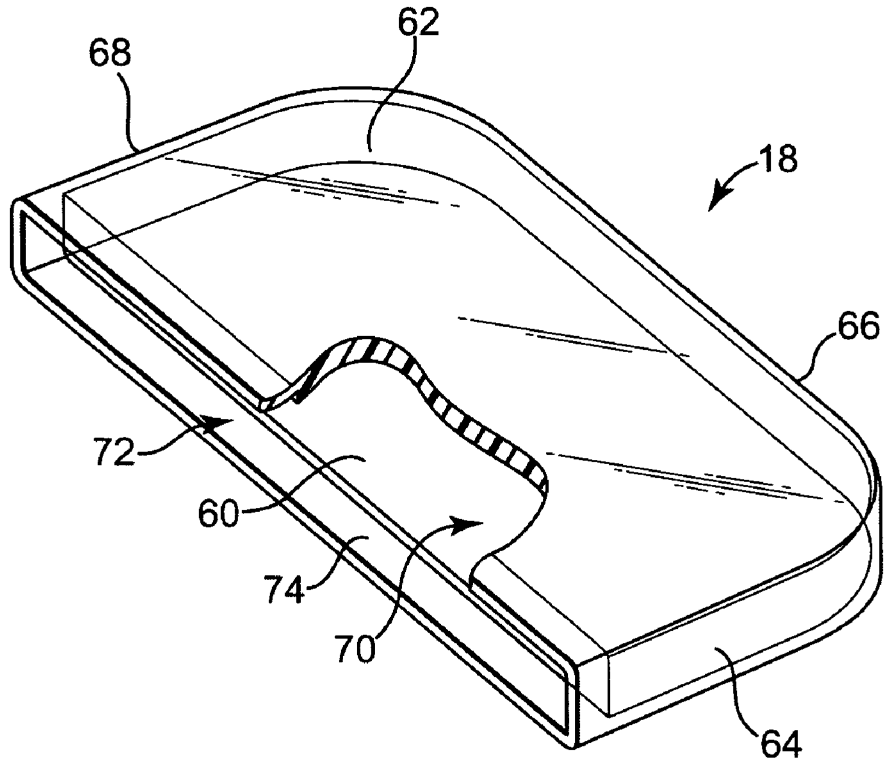
FIG. 2 is a left side, perspective view of one embodiment of a first housing member of the stored-value card of FIG. 1A, according to the present invention.

Referring to FIG. 1A and FIG. 2, second housing member 18 includes first and second major panels 60 and 62. In one embodiment, major panels 60 and 62 are substantially planar and are spaced from and extend substantially parallel with one another. Major panels 60 and 62 are similarly sized and shaped. For instance, in one example, each major panel 60 and 62 is substantially rectangular. Side walls 64, 66, and 68 each extend from a different side of and between major panels 60 and 62. More specifically, first side wall 64 extends substantially parallel to third side wall 68. Second side wall 66 extends between first and third side walls 64 and 68. In view of this configuration, second housing member 18 defines a cavity 70, which is substantially enclosed except for an opening 72 formed opposite second side wall 66.

Major panels 60 and 62 and first and third side walls 64 and 68 define an area of reduced thickness 74 of second housing member 18 near and around opening 72. In one embodiment, area of reduced thickness 74 extends from opening 72 a distance similar to a distance flange 36 extends from opening 34 of first housing member 16 (FIG. 1A). As such, area of reduced thickness 74 is configured to receive flange 36 of first housing member 16 as will be further described below.

In one embodiment, each of first and second housing members 16 and 18 is formed by injection molding a plastic such as polystyrene, acrylic styrene, or any other suitable material to define the various attributes of first and second housing members 16 and 18. In one embodiment, at least one of first and second housing members 16 and 18 is substantially translucent or transparent. In one example, first and second housing members 16 and 18 are each substantially rigid.

Referring to FIG. 1C, an account identifier 40 is included on housing 12. Account identifier 40 indicates a financial account or record to which stored-value card 10 is linked. The account or record maintains the monetary balance on stored-value card 10 and is optionally stored on a database, other electronic or manual record-keeping system, or in the case of "smart" cards for example, on a chip or other electronic device on stored-value card 10 itself. Accordingly, by scanning account identifier 40, a financial account or record linked to stored-value card 10 is identified and can subsequently be activated, have amounts debited therefrom, and/or have amounts added thereto. In view of the above, account identifier 40 is one example of means for linking stored-value card 10 with a financial account or record.

In one embodiment, account identifier 40 is in the form of a bar code, magnetic strip, smart chip or other electronic device, radio frequency identification (RFID) device, or other suitable device or marking readily readable by a point-of-sale terminal, account access station, kiosk, or other suitable device. In one example, housing 12 is translucent or transparent, and an opaque field 44 is printed or otherwise applied to outside surface 42 of first housing member 14 and/or an opaque field 75 is printed or otherwise applied to an outside surface 76 of second housing member 18. In one embodiment, each opaque field 44 and 75 extends across a substantial entirety of corresponding outside surface 42 or 76 to substantially block viewing of corresponding chamber 32 or 70 (FIGS. 1A and 2) through the respective outside surface 42 or 76. In one embodiment, outside surfaces 42 and 76 are otherwise configured to be opaque. One or both of opaque fields 44 and 75 is configured to be printed with at least a portion of account identifier 40. In the case of a bar code account identifier 40, opaque field(s) 44 and/or 75 facilitates scanning of account identifier 40.

In one embodiment, redemption indicia 46 are included on housing 12, such as on opaque field 44 or 75. Redemption indicia 46 indicate that stored-value card 10 is redeemable for the purchase of goods and/or services, and that, upon use, a value of the purchased goods and/or services will be deducted from a financial account or record linked to a stored-value card 10. In one embodiment, redemption indicia 46 include phrases such as "<NAME OF STORE> GiftCard" and "This GiftCard is redeemable for merchandise or services at any of our stores or at our website," and/or provides help or telephone information in a case of a lost, stolen, or damaged stored-value card, etc.

In one embodiment, other indicia are printed or otherwise disposed on one or more of outside surface 42 of first major panel 20 and an outside surface 48 of second major panel 22. Other indicia may be included on first housing member 16 such as other objects, text, backgrounds, graphics, brand identifiers, etc. In one example, additional indicia 50 are disposed on outside surface 48 via a face panel 52 (FIG. 1A). Face panel 52 is printed with indicia 50 and is configured to be adhered or otherwise attached to outside surface 48 of first housing member 16. In one example, face panel 52 is transparent or translucent except for any indicia 50. In one embodiment, face panel 52 is formed of any suitable material such as polypropylene, polyester, paper, or any other suitable material.

In one example, additional indicia 50 include decorative and/or informative items, such as objects relating to the nature of the stored-value card 10. In one embodiment, in view of the inclusion of glow article 14 in housing 12, indicia 50 include items relating to Halloween or other event to which glow article 14 corresponds or is being offered in connection therewith. For example, indicia 50 may include a spider or other representation relating to Halloween or any other holiday, occasion, or promotion. In one example, face panel 52 is translucent or substantially transparent such that the contents, if any, of first housing member 16 can be viewed through not only face panel 52 but also second major panel 22. In one embodiment, indicia 50 may alternatively or additionally identify a brand associated with a stored-value card 10, such as identifying a product brand, a store brand or logo, etc. Other suitable combinations or selections of indicia 50 to be displayed on face panel 52 are also contemplated.

Referring to FIG. 1A, indicia 78 are printed or otherwise disposed on outside surface 76 of second housing member 18 including any variety of items such as objects, text, backgrounds, graphics, brand or store identifiers, etc. In one embodiment, indicia 78 are disposed on outside surface 76 via a face panel 79. Face panel 79 is printed with indicia 78 and is configured to be adhered to or otherwise attached to outside surface 76. In one example, face panel 79 is transparent or translucent except for any indicia 78. In one embodiment, face panel 79 is formed of any suitable material such as polypropylene, polyester, paper, or any other suitable material. In one embodiment, indicia 50 and 78 are interchangeable and/or are both included on one or both of face panel 52 and face panel 79.

Figure 3:
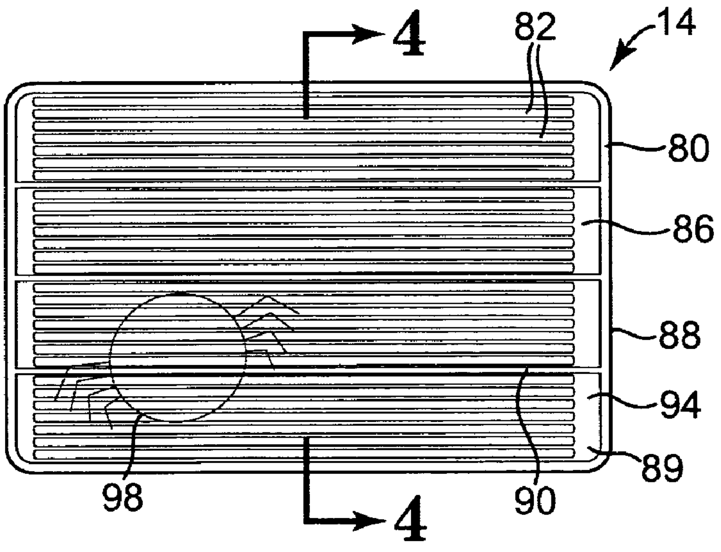
FIG. 3 is a back view illustrating one embodiment of a glow article of the stored-value card of FIG. 1, according to the present invention.

Referring to FIGS. 1A and 3, glow article 14 is any device suitable for producing a chemically luminescent glow. In one embodiment, glow article 14 includes a transparent or translucent casing or shell 80 and one or more vials or ampoules 82 enclosed therein. In one embodiment, vials 82 are formed of glass (such as, for example, Vycor® glass available from Corning, Inc. of Corning, N.Y.) or other breakable material. Casing 80 is formed of any desired shape configured to fit within housing 12 and is generally flexible in comparison to housing members 16 and 18. In one embodiment, casing 80 is generally rectangular and relatively thin such that a first major member 84 is defined and extends substantially parallel to and slightly spaced from a second major member 86 of casing 80.

A side wall 88 wraps around and extends between major members 84 and 86 to define at least one enclosed cavity 89 between major members 84 and 86 and side wall 88. In one embodiment, one or more internal walls 90 are additionally included and extend between major members 84 and 86. In one example, each internal wall 90 extends longitudinally within casing 80 to define a plurality of enclosed cavities 89 therein. Each cavity 89 is separate from the other cavities 89. In one embodiment, each cavity 89 extends longitudinally in casing 80 and is laterally adjacent to at least one other cavity 89. In one embodiment, three substantially linear internal walls 90 are included and laterally spaced from one another to define four cavities 89 within casing 80.

One or more of vials 82 are maintained within each cavity 89. Each vial 82 is a small closed vessel and includes a first chemiluminescent component 92 therein. In one embodiment, each vial 82 is elongated and is placed within a cavity 89 to run substantially parallel with internal wall(s) 90, if any. First chemiluminescent component 92 is configured to be mixed and to chemically react with a second chemiluminescent component 94 to create energy and release light without substantial heat generation. In one embodiment, second chemiluminescent component 94 is maintained within each cavity 89 and at least partially surrounds vials 82 also included therein. In one embodiment, each chemiluminescent component 92 and 94 is a liquid component. Accordingly, in one embodiment, internal walls 90 divide casing 80 into a plurality of internal cavities 89 each including vials 82 and second chemiluminescent component 94 at least in part to maintain a relatively even positional distribution of vials 82 and second chemiluminescent component 94 throughout casing 80. As such, vials 82 in casing 80 are one example of means for separately maintaining at least two chemiluminescent components 92 and 94.

In one embodiment, first and second chemiluminescent components 92 and 94 collectively include all the ingredients for the desired chemiluminescent reaction. In one example, first and second chemiluminescent components 92 and 94 collectively include the following ingredients: dibutyl phthalate, dimethyl phthalate, cppo-bis(2-carbopentyloxy-3,5,6-trichlorophenyl) oxalate (for example, two percent copper sulfate pentahydrate with approximately 1 liter of distilled water), T-butyl alcohol, hydrogen peroxide solution (for example, 3% hydrogen peroxide with approximately 1 liter of distilled water), 9,10-bis(phenylethynyl) anthracene. More specifically, one or more of each of the ingredients are mixed together to form each of first and second chemiluminescent components 92 and 94.

Of note, each of first and second chemiluminescent components 92 and 94 are missing at least one of the ingredients required to complete the chemiluminescent reaction, such that prior to initiation of the reaction by a bearer of stored-value card 10, or at least of glow article 14, chemical luminescence does not occur. In particular, in one example, dibutyl phthalate, cppo-bis(2-carbopentyloxy-3,5,6-trichlorophenyl) oxalate, and 9,10-bis(phenylethynyl) anthraceneare are included in solution form as first chemiluminescent component 92 in each of vials 82, and dimethyl phthalate, T-butyl alcohol, and hydrogen peroxide solution are included in solution form as second chemiluminescent component 94 in chamber(s) 89 around vials 82. Use of other suitable first and second chemiluminescent components 92 and 94 configured to create luminescence when mixed is also contemplated.

With the above construction in mind, the flexible nature of casing 80 allows glow article 14 to be bent along an axis (not shown) generally defined as orthogonally extending relative to vials 82 a sufficient degree to cause vials 82 to break. When vials 82 break, first chemiluminescent component 92, which was once contained in vials 82, mixes with second chemiluminescent component 94 within chamber 89. Contact between chemiluminescent components 92 and 94 initiates the chemical reaction which causes glow article 14, or more particular, the mixture of chemiluminescent component 92 and 94, to fluoresce or glow. Glow article 14 continues fluoresce until the chemical reaction is complete.

In one embodiment, casing 80 is printed with or otherwise includes indicia 96 and/or 98 printed or otherwise disposed on first major member 84. Indicia 96 may include any variety of items such as objects, text, backgrounds, graphics, etc. In one embodiment, indicia 96 visually correspond with indicia 50 and/or 78 of housing 12. Indicia 98 relate to a brand identifier of a retail outlet, store, product, etc. may include any variety of items such as objects, text, backgrounds, graphics, etc.

During assembly, glow article 14 is placed within one of first housing member 16 and second housing member 18. Once glow article 14 is positioned, second housing member 18 is coupled with first housing member 16, thereby enclosing glow article 14 therebetween, more particularly within cavities 32 and 70 (FIG. 2). More specifically, in one embodiment, first housing member 16 is slid toward and together with second housing member 18 such that flange 36 of first housing member 16 is received by the area of reduced thickness 74 of second housing member 18. As such, first and second housing members 16 and 18 are coupled to one another with a friction fit. First and second housing members 16 and 18 are one example of means for enclosing glow article 14. Other methods of coupling housing members 16 and 18 or enclosing glow article 14 are also contemplated.

More specifically, second side wall 26 of first housing member 16 and second side wall 66 of second housing member 18 each independently define an opposite, external end wall of housing 12. First and second housing members 16 and 18 collectively define opposite external side walls of housing 12 each extending between side walls 26 and 66. In one embodiment, the resulting housing 12 is substantially rectangular and sized similarly to an identification card, a credit card, or other card sized to fit in a wallet of a user. In one embodiments, housing 12 is shaped as a square, circle, oval, star, or another suitable shape.

Due to the transparency or translucence of housing 12, in particular, first major members 22 and 62, and face panels 52 and 79, upon assembly, glow article 14 can be viewed through housing 12. As such, in one example, at least a portion of indicia 96 and/or 98 of glow article 14 is viewable through housing 12 and face panels 52 and 79 such that indicia 96 can simultaneously be viewed with indicia 50 and 78 when stored-value card 10 is assembled. In one embodiment, indicia 96 and/or 98 are at least partially hidden by indicia 50 and/or 78 of housing 12 upon assembly of stored-value card 10. In one example, wherein casing 80 is transparent or translucence, the vials 82 are also visible through housing 12 and face panels 52 and 79.

During use of stored-value card 10 for entertainment purposes, first and second housing members 16 and 18 are separated and glow article 14 is removed from within first and second housing members 16 and 18. As described above, glow article 14 is subsequently bent a sufficient degree to cause vials 82 to break, thereby causing first chemiluminescent component 92 to mix with second chemiluminescent component 94 within chamber 89. As such, a chemical reaction between first and second chemiluminescent components 92 and 94 is performed, which causes glow article 14, or more particular, the mixture of chemiluminescent component 92 and 94, to fluoresce or glow. The glow of glow article 14 continues until the chemical reaction is complete. In one embodiment, the glowing glow article 14 is placed back within housing 12 such that the glow of glow article 14 is at least partially viewed through the housing 12.

Figure 5A:
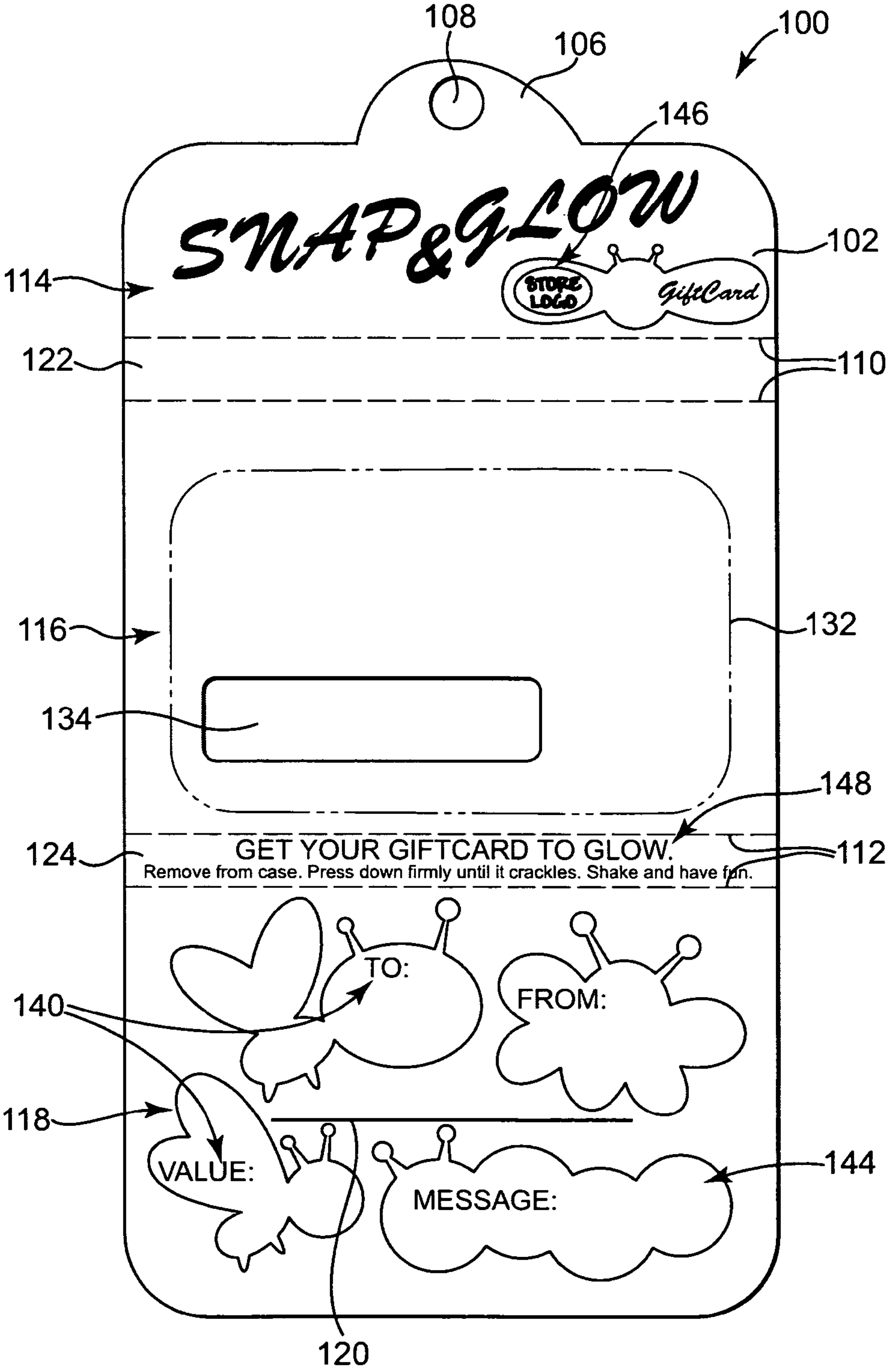
FIG. 5A is a front view illustrating one embodiment of an unfolded carrier for a stored-value card, according to the present invention.
Figure 5B:
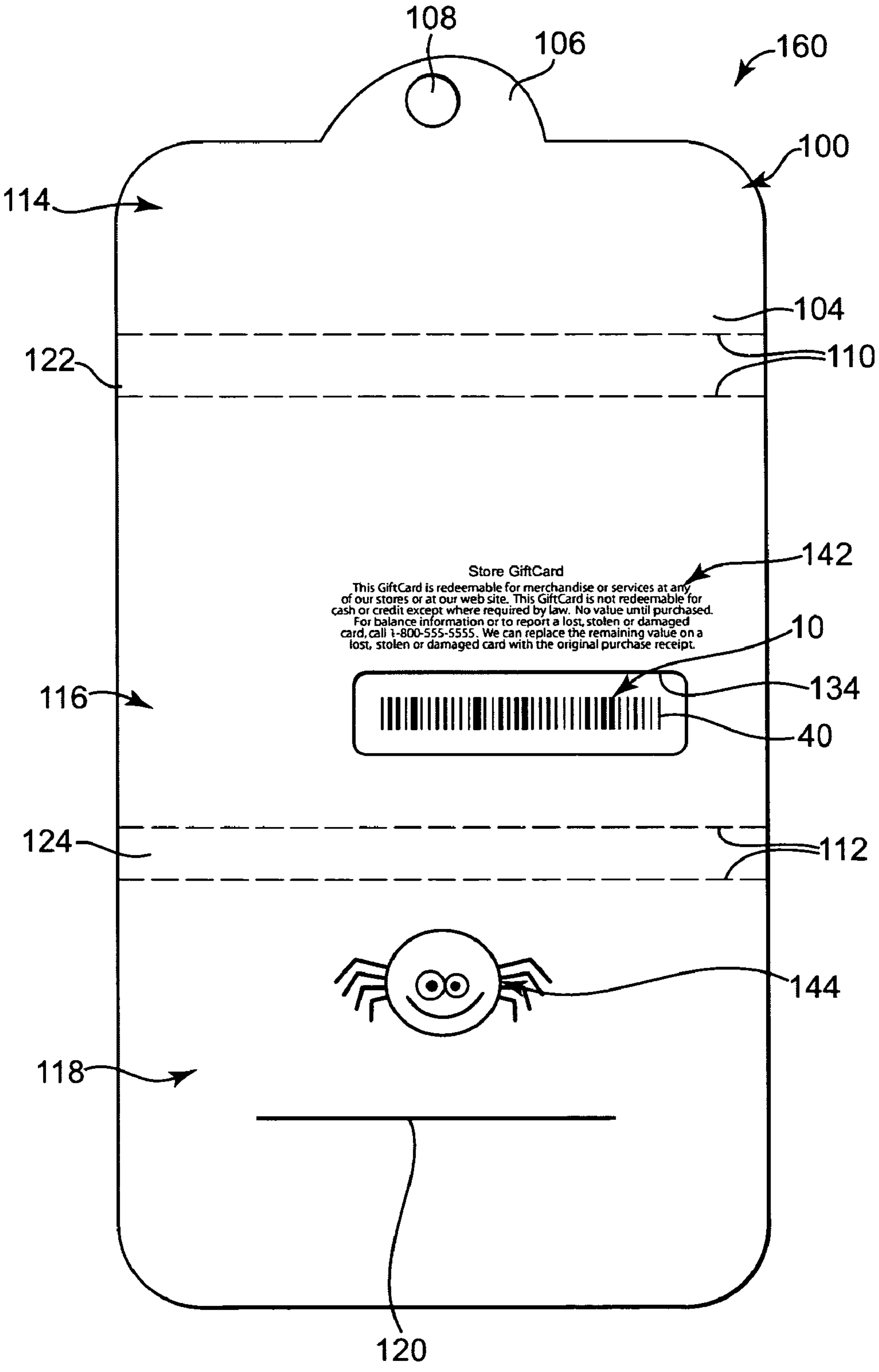
FIG. 5B is a back view illustrating the unfolded carrier of FIG. 4A supporting a stored-value card, according to the present invention.

FIGS. 5A and 5B illustrate a carrier or backer 100 for supporting stored-value card 10 (FIGS. 1A-1C). Stored-value card 10 is readily releasably attached to backer 100, for example, by an adhesive or the like, and is represented in phantom lines in FIG. 5A. Backer 100 includes a single layer or multiple layers of paper or plastic material, for example, generally in the form of a relatively stiff but bendable/flexible card. Other materials are also contemplated. In one embodiment, backer 100 is generally a planar substrate having a generally elongated or rectangular shape. Accordingly, backer 100 defines a first surface 102 (FIG. 5A) and a second surface 104 (FIG. 5B) opposite first surface 102. A tab 106 is generally centered at a first lateral end of backer 100. In one example, a support arm aperture 108 is defined within tab 106 and is configured to receive a support arm or hook. As such, an open backer 100 can be hung via aperture 108 on the support arm or hook for display in a retail setting.

Fold lines 110 and 112 each extend laterally across backer 100 and are spaced longitudinally from one another. More specifically, fold lines 110 are positioned relatively near tab 106 as compared to fold lines 112. A first panel 114, a second or intermediate panel 116, and a third panel 118 are defined by the position of fold lines 110 and 112. First panel 114 extends from fold lines 110 away from fold line 112 and includes tab 106. Second or intermediate panel 116 extends between fold lines 110 and 112. Third panel 118 extends from fold lines 112 in a direction opposite fold lines 110. A laterally extending slit 120 is laterally centered on third panel 118. In one example, a first transition panel 122 is defined between fold lines 110 and a second transition panel 124 is defined between fold lines 112. In other embodiments, rather than providing multiple fold lines 110, a single fold line 110 is provided. Similarly, in one embodiment, a single fold line 112 is provided as opposed to the multiple fold lines 112 illustrated in FIG. 4A.

Figure 4:
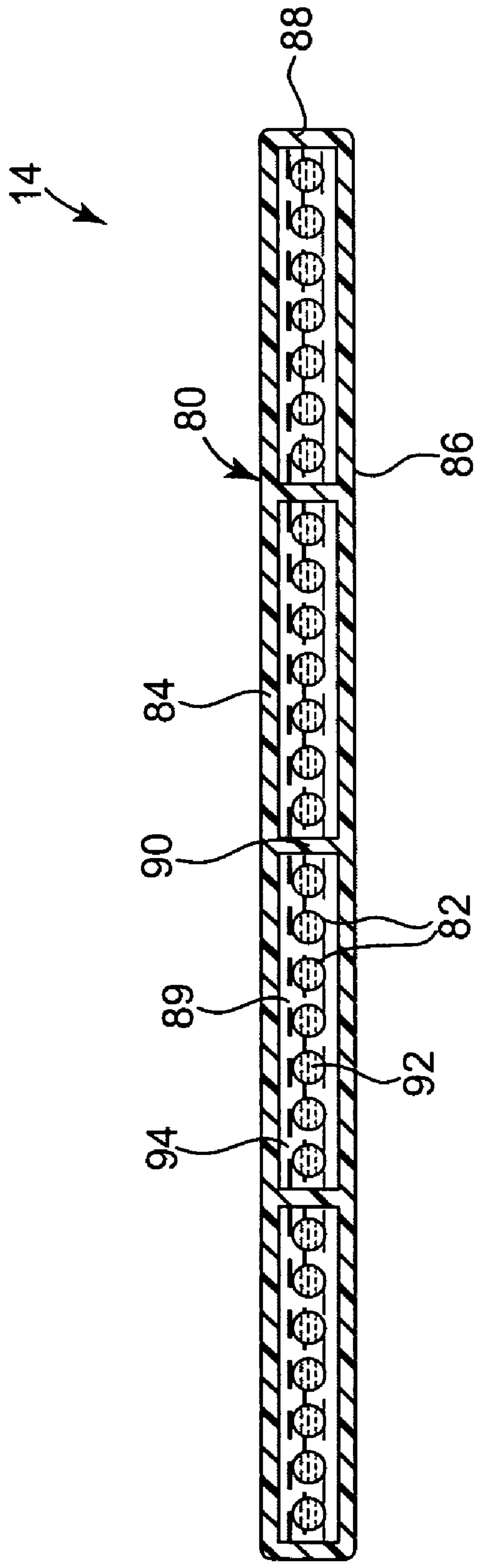
FIG. 4 is a cross-sectional view illustrating one embodiment of the glow article of FIG. 3 taken along the line 4-4 in FIG. 3.

In one example, first surface 102 is configured to receive stored-value card 10 (illustrated in FIG. 1) as generally indicated by broken line 132 (FIG. 4A). Stored-value card 10 will be adhered or otherwise coupled to first surface 102 of intermediate panel 116. In one embodiment, backer 100 additionally defines a window or opening 134 for displaying account identifier 40 of stored-value card 10 as illustrated in the rear view of FIG. 4B. As previously described, account identifier 40 is adapted for accessing a financial account or record associated with stored-value card 10 for activating, loading, or debiting from the financial account or record. Accordingly, opening 134 allows access to account identifier 40 to activate and/or load stored-value card 10 without removing stored-value card 10 from backer 100.

In one embodiment, backer 100 displays additional indicia, graphics or text information including store logo(s), store name(s), slogans, advertising, instructions, directions, brand indicia, promotional information, media format identifiers (e.g. characters, logos, scenes, or other illustrations relating to at least one of a movie, television show, book, etc.), characters, and/or other information. For example, backer 100 includes indicia 140, 142, 144, and/or 146. Indicia 140 include to, from, message, and initial value fields. Indicia 140 instruct an original consumer to write or otherwise depict on backer 100 the name of the recipient, the name of the original consumer or other presenter, a message regarding why stored-value card 10 is being presented, or any other suitable sentiment, and for indicating for what amount is initially stored to the financial transaction account or record associated with stored-value card 10.

Indicia 142 indicate that stored-value card is redeemable for the purchase of goods and/or services and that, upon use, of value of purchased goods and/or services will be deducted from the financial account or record linked to stored-value card 10. In one embodiment indicia 142 include phrases "<NAME OF STORE> GiftCard and "This GiftCard is redeemable for merchandise or services at any of our stores or at our website" and/or provides help or phone line information in case of a lost, stolen, or damaged stored-value card 10, etc.

Indicia 144 are decorative indicia and generally improve the aesthetic appeal and marketing draw of backer 100. In one embodiment, indicia 144 are positioned and configured to correspond with or incorporate indicia 50 and/or 96 of stored-value card 10 upon of placement of stored-value card 10 on backer 100. For example, where indicia 50 and/or 96 relate to a holiday such as Halloween or a theme such as bugs, indicia 144 may also relate to the holiday or theme to present an overall cohesive visual presentation to a user when stored-value card 10 is placed on backer 100.

Indicia 146 identify a store, brand, department, media title or logo, e.g. a title or logo of a movie, book, television show, video game etc. associated with stored-value card 10, etc. In one embodiment, indicia 146 are additionally or alternatively included on first surface 102 and/or second surface 104 of backer 100. Other indicia, e.g. indicia promoting that stored-value card 10 includes glow article 14 and/or general directions as to how to use stored-value card 10 or glow article 14, may also be included as generally illustrated at 148. In one embodiment, any of indicia 140, 142, 144, 146, 148, or other indicia, optionally may appear anywhere on backer 100 or stored-value card 10.

Backer 100 is configured to receive stored-value card 10 on first surface 102 of intermediate panel 116. In particular, stored-value card 10 is releasably adhered or otherwise secured to intermediate panel 116 as indicated generally at 132. In one example, once stored-value card 10 is secured to backer 100, decorative indicia 50 of stored-value card 10 coordinates a decorative indicia 144 of backer 100. In one embodiment, backer 100 is hung from a support arm or hook for display in a retail setting in a manner in which at least stored-value card 10 and the portion of surface 102 of backer 100 is visible to potential consumers. In this manner, potential consumers are able to view stored-value card 10 prior to purchase of stored-valued card 10. In this respect, indicia 144 likely serve to entice a potential consumer to purchase stored-value card 10.

During purchase, account identifier 40 of stored-value card 10 is accessed at a point of sale via opening 134 to activate, load, and/or debit from the account associated with stored-value card 10. After purchase, backer 100 is configured such that first panel 114 and third panel 118 are foldable about fold lines 110 and 112, respectively, to enclose or selectively wrap stored-value card 10 as desired. More particularly, third panel 118 is rotated about fold lines 112 so that first surface 102 of third panel 118 is moved toward first surface 102 of intermediate panel 116. Subsequently, first panel 114 is rotated about fold lines 110 so that first surface 102 of first panel 114 is moved toward first surface 102 of intermediate panel 116.

In one embodiment, each fold line 110 and 112 includes two longitudinally spaced fold lines to more easily accommodate the thickness of stored-value card 10 when backer 100 is in a folded position. In this respect, after folding, each of first panel 114, second panel 116, and third panel 118 are positioned to be substantially parallel with and/or overlap one another. For example, first panel 114 at least partially overlaps third panel 118. Tab 106 is slid into slit 120 of third panel 118 to selectively lock backer 100 in a folded or closed position (not shown) about stored-value card 10. Folding of first and third panels 114 and 118 of backer 100 in the opposite directions about fold lines 110 and 112 for display in a retail store is also contemplated.

When in the folded position, stored-value card 10 is selectively wrapped for presentation to a recipient of stored-value card 10. Upon receipt, the recipient unfolds backer 100 to access stored-value card 10. Accordingly, recipient or other bearer can use stored-value card 10, or at least separate portions thereof, as a luminescent article or as tender in financial transactions. Backers similar to backer 100 can be used with various sizes and shapes of stored-value cards 10. Other backers or packages are also contemplated for supporting and/or substantially enclosing stored-value card 10.

Figure 6:
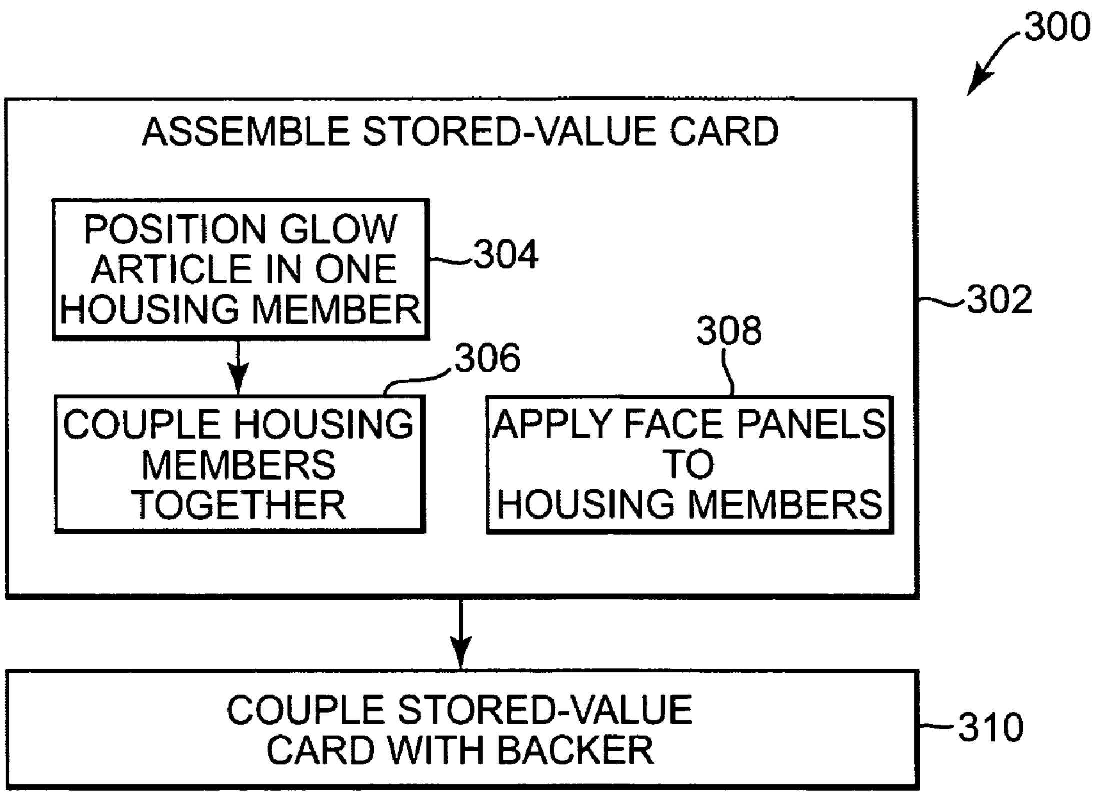
FIG. 6 is a flow chart illustrating one embodiment of a method of assembling a stored-value card, according to the present invention.

FIG. 6 is a flow chart illustrating one embodiment of a method 300 of assembling stored-value card 10 with backer 100. Additionally referring to FIG. 1A, at 302, stored-value card 10 is assembled. More specifically, at 304, glow article 14 is positioned within one of cavity 32 of first housing member 16 and cavity 70 of second housing member 18. Subsequently, at 306, first and second housing members 16 and 18 are slid and coupled together. More specifically, flange 36 of first housing member 16 is received by area of reduced thickness 74 of second housing member 18. As such, housing members 16 and 18 are coupled together via a friction fit such that glow article 14 is enclosed therebetween within cavities 32 and 70 (FIG. 2). In one embodiment, before, after, or simultaneously with operations 304 and 306, face panels 52 and 79 are applied to outside surface 48 of first housing member 16 and outside surface 76 of second housing member 18, respectively, at 308.

At 310, the assembled stored-value card 10 is coupled with backer 100 to form a stored-value card assembly 160 as illustrated with additional reference to FIG. 5B. In one example, stored-value card 10 is coupled to backer 100 with an adhesive or other selectively releasable material or device such that account identifier 40 is viewable through opening 134 of backer 100 as illustrated in FIG. 5B. In one embodiment, backer 100 is folded into a folded position for shipment and/or display to retail settings. Backer 100 is, more specifically, folded by folding backer 100 about fold line(s) 110 to mate the backer surfaces illustrated in FIG. 5B. As such, a portion of backer 100 with stored-value card 10 is visible from one side of folded backer 100. Backer 100 can also be folded in the opposite direction about fold line(s) 110 to substantially enclosed stored-value card 10. In one embodiment, backer 100 is displayed in an unfolded position hung from a support arm via support arm aperture 108.

Figure 7:
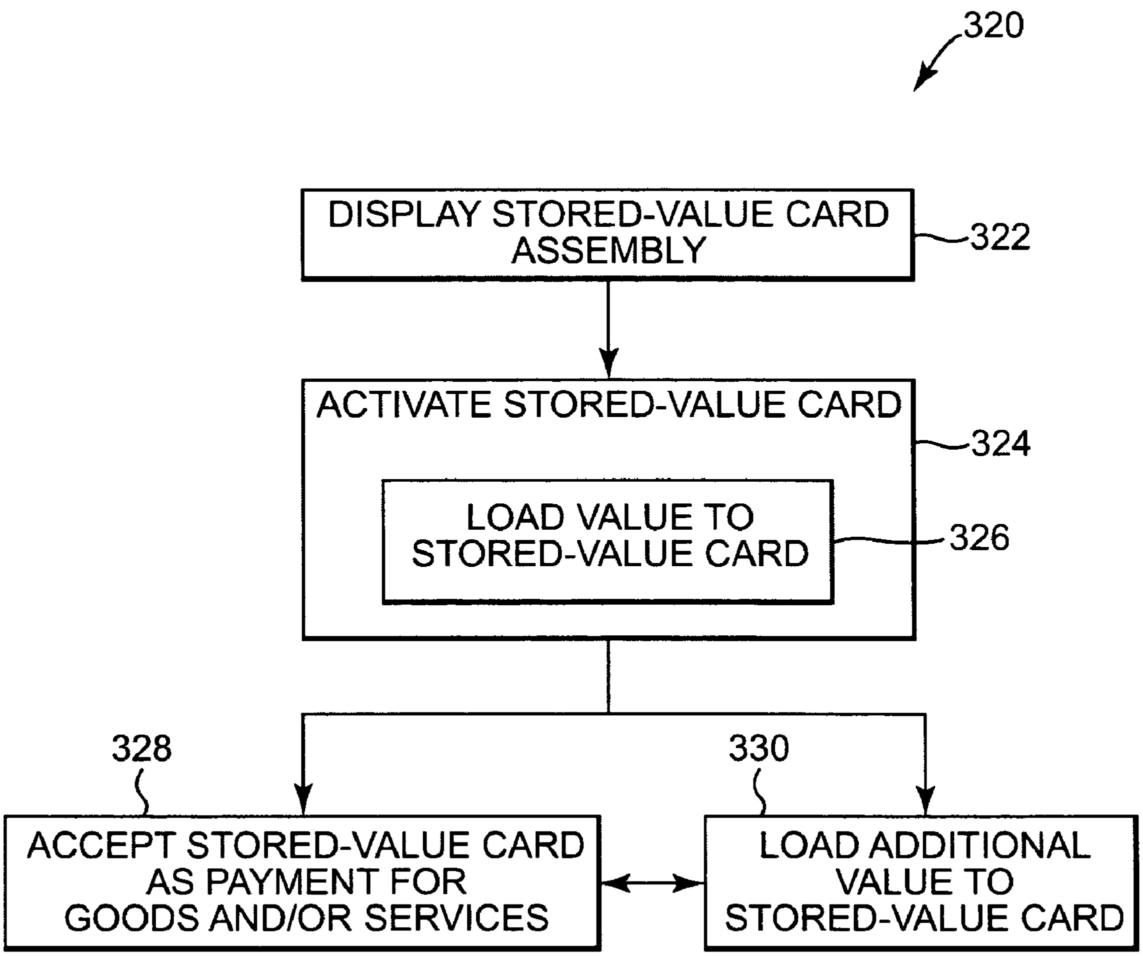
FIG. 7 is a flow chart illustrating one embodiment of a method of providing a stored-value card, according to the present invention.

FIG. 7 is a flow chart illustrating one embodiment of a method 320 of providing stored-value card assembly 160 for sale to and for use by consumers. At 322, stored-value card assembly 160 is placed or hung from a rack, shelf, or similar device to display stored-value card assembly 160 for sale to potential consumers. In one example, stored-value card assembly 160 is placed for sale such that stored-value card 10 is visible to potential consumers. In one embodiment, a depiction of stored-value card assembly 160 is placed on a website for viewing and purchase by potential consumers. In one embodiment, stored-value card 10 is displayed without backer 100.

At 324, a consumer, who has decided to purchase stored-value card 10, presents stored-value card assembly 160 or at least stored-value card 10 to a retail store employee, retail store kiosk, or other person or device to scan account identifier 40 of stored-value card 10 through opening 134 in backer 100 to access the financial account or record linked to account identifier 40. Upon accessing the financial account or record, the account or record is accessed and value is added to the financial account or record at 326. Thus, stored-value card 10 is activated and loaded. Once stored-value card 10 is activated and loaded, stored-value card 10 can be used by the consumer or any other bearer of stored-value card 10 to purchase goods and/or services at the retail store or other affiliated retail setting or website.

At 328, the retail store or other affiliated retail setting or website accepts stored-value card 10 as payment towards the purchase of goods and/or services made by the current bearer of stored-value card 10. In particular, the value currently loaded on stored-value card 10 is applied towards the purchase of goods and/or services. At 330, additional value is optionally loaded on stored-value card 10 at a point-of-sale terminal, kiosk, or other area of the retail store or related setting. Upon accepting stored-value card 10 as payment at 328, the retail store or related setting can subsequently perform either operation 328 again or operation 330 as requested by a current bearer of stored-value card 10. Similarly, upon loading additional value to stored-value card 10 at 330, the retail store or related setting can subsequently perform either operation 330 again or operation 328. In one example, the ability to accept stored-value card 10 as payment for goods and/or services is limited by whether the financial account or record associated with stored-value card 10 has any value at the time of attempted redemption.

Figure 8:
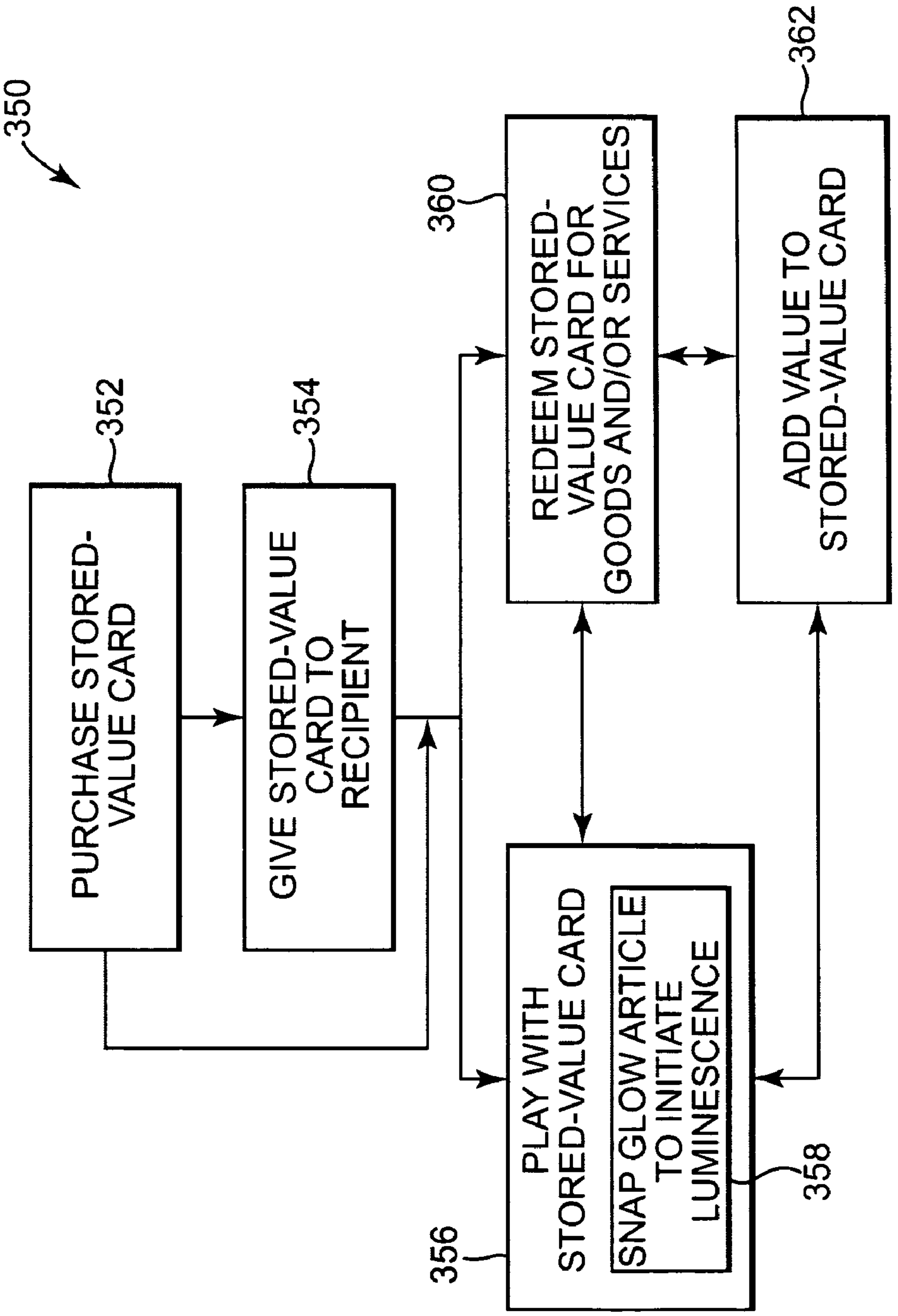
FIG. 8 is a flow chart illustrating one embodiment of a method of using a stored-value card, according to the present invention.

FIG. 8 is a flow chart illustrating one embodiment of a method 350 of using stored-value card 10. At 352, a potential consumer of stored-value card 10, which is displayed in a retail store or viewed on a website, decides to and does purchase stored-value card 10 from the retail store or website setting. Stored-value card 10 can be displayed and purchased alone or as part of the stored-value card assembly 160. Upon purchasing of stored-value card 10, a retail store employee, retail store kiosk, or other person scans account identifier 40 and to thereby activate or load value onto stored-value card 10.

At 354, the consumer optionally gives stored-value card 10 to a recipient, such as a graduate, relative, friend, expectant parents, one having a recent or impending birthday, a couple having a recent or impending anniversary, etc. As an alternative, the consumer can keep stored-value card 10 for his or her own use.

At 356, the consumer or recipient, whoever is in current ownership or otherwise is the current bearer of stored-value card 10, plays with stored-value card 10. More specifically, the bearer removes stored-value card 10 from backer 100, if stored-value card 10 is coupled with backer 100. The bearer opens housing 12 by separating first housing member 16 from second housing member 18 to access glow article 14. At 358, upon removing glow article 14 from housing 12, glow article 14 can be bent, cracked, snapped, or otherwise manipulated to break vials 82 contained therein and to mix first chemiluminescent component 92 with second chemiluminescent component 94. Mixing of chemiluminescent components 92 and 94 may be further encouraged by shaking glow article 14 after breaking vials 82. The resultant solution within glow article 14 provides illumination or luminescence. As such, the bearer of stored-value card and other observers are entertained.

At 360, the current bearer of stored-value card 10 redeems stored-value card 10 for goods and/or services from the retail store or website. At 362, the current bearer of stored-value card 10 optionally adds value to stored-value card 10, and more particularly, to the financial account or financial record associated with stored-value card 10, at the retail store or over the Internet. Upon playing with stored-value card 10 at 356, redeeming stored-value card 10 at 360, or adding value to stored-value card 10 at 362, the current bearer of stored-value card 10 subsequently can perform any of operations 356, 360, or 362 as desired. In one embodiment, the ability of the current bearer to repeat redeeming stored-value card 10 at 360 is limited by whether the financial account or record associated with stored-value card 10 has any value at the time of attempted redemption. In one embodiment, only glow article 14 is used to play with stored-value card 10 at 356 and only housing 12 is used to redeem stored-value card 10 at 360. As such, in one example, operations 356 and 360 can be simultaneously preformed.

Although described above as occurring at single retail store or website, in one embodiment, purchasing stored-value card 10 at 352, redeeming stored-value card 10 at 360, and adding value to stored-value card 10 at 362, can each be performed at any one of a number of stores adapted to accept stored-value card 10 or over the Internet. In one example, the number of stores are each a part of a chain or similarly branded stores. In one example, the number of stores includes at least one website and/or at least one conventional brick and mortar store.

Stored-value cards come in many forms, according to embodiments of the invention. The gift card, like other stored-value cards, can be "recharged" or "reloaded" at the direction of the original consumer, the gift recipient, or third party. The term "loading on" or "loaded on" herein should be interpreted to include adding the balance of a financial account or record associated with a stored-value card. The balance associated with a stored-value card declines as the card is used, encouraging repeat visits. The card remains in the users purse or wallet, serving as an advertisement or reminder to revisit the associated merchant. Gift card, according to embodiment so the invention, providing a number of advantages to both the consumer and the merchant. Other gift cards and stored-value cards according to embodiments of the invention include loyalty cards, merchandise return cards, electronic gift certificates, employee cards, frequent c cards, pre-paid cards and other types of cards associated with or representing purchasing power or monetary value, for example.

Although the invention has been described to particular embodiments, such embodiments are for illustrative purposes only and should not be considered to limit the invention. Various alternatives and changes will be apparent to those with ordinary skills in the art. Other modifications within the scope of the invention in its vary embodiments will be apparent of ordinary skill.

What is claimed is:

1. A stored-value card system comprising:

a stored-value card including:

a housing including an account identifier adapted to link the stored-value card to a financial account or a financial record, and a glow article enclosed within the housing, wherein the glow article is configured to be selectively removed from the housing and manipulated to initiate chemical luminescence of the glow article; and a database storing the financial account or the financial record, wherein the financial account or the financial record tracks a monetary value available toward future purchases of at least one of goods and services.

2. The stored-value card system of claim 1, wherein the housing includes a first housing member and a second housing member that couples with the first housing member to enclose the glow article therebetween, and the glow article is removably maintained at least partially within each of the first housing member and the second housing member.

3. The stored-value card system of claim 2, wherein the housing is substantially rectangular and the first housing member independently defines a first end of the housing, the second housing member independently defines a second end of the housing opposite the first end, and the first housing member and the second housing member each form a portion of a side edge of the housing extending between the first end and the second end.

4. The stored-value card system of claim 2, wherein the first and second housing members couple together with a friction fit such that the first housing member is configured to be selectively and repeatedly coupled to and uncoupled from the second housing member.

5. The stored-value card system of claim 2, wherein the first housing member and the second housing member are each substantially one of translucent and transparent.

6. The stored-value card system of claim 5, further comprising a face panel adhered to the first housing member;

wherein the face panel is substantially one of translucent and transparent and is printed with a first graphic, the glow article includes a flexible casing enclosing breakable vials each containing a first chemiluminescent component, a second graphic is applied to the flexible casing, and when the stored-value card is fully assembled, the first graphic, the second graphic, and the first chemiluminescent component are simultaneously viewable from a front of the stored-value card.

7. The stored-value card system of claim 1, wherein the glow article includes:

a flexible casing defining at least one internal cavity, and at least one breakable vial enclosed within each cavity, each of the at least one breakable vial containing a first chemiluminescent component, and each of the at least one internal cavity containing a second chemiluminescent component the flexible casing is substantially rectangular and relatively thin, and the housing is substantially rigid and defines a chamber shaped similarly to and sized slightly larger than the glow article.

8. The stored-value card system of claim 7, wherein the at least one internal cavity is a plurality of internal cavities separated from one another via one or more internal walls extending in a first direction within the flexible casing, each of the plurality of internal cavities extends substantially parallel with one another, the at least one breakable vial is a plurality of breakable vials each extending in the first direction, and the plurality of breakable vials are positioned adjacent one another in a second direction opposite the first direction.

9. The stored-value card system of claim 1, in combination with a backer removably coupled to the stored-value card, wherein the backer is configured to selectively wrap the stored-value card such that the account identifier of the stored-value card is accessible through the backer, the housing includes a back surface positioned directly adjacent the backer, and the account identifier is fixedly coupled to the back surface of the housing.

10. A financial transaction card system comprising:

a financial transaction card including;

means for separately maintaining at least two chemiluminescent components, wherein the means for separately maintaining is configured to be manipulated to cause mixing of the at least two chemiluminescent components to illuminate the financial transaction card, means for linking the means for separately maintaining to a financial account or a financial record, and means for enclosing the means for separately maintaining and for being entirely separable from the means for maintaining, wherein the means for enclosing is rigid and at least partially one of transparent and translucent, and the means for linking is fixedly coupled with the means for enclosing; and means for storing the financial account or the financial record to facilitate tracking of a financial value available for use toward future purchases of one or more of goods and services when the financial transaction card is provided at one or more of points of sale processing the purchases.

11. The financial transaction card system of claim 10, wherein the means for enclosing includes a first member and a second member, each of the first member and the second member being configured to partially enclose the means for separately maintaining.

12. A method of encouraging purchase and facilitating use of a financial transaction card linked to a financial account or a financial record, the method comprising:

displaying the financial transaction card to a potential consumer, the financial transaction card including an enclosure removably storing an article configured to provide chemical luminescence;

activating the financial transaction card to permit deductions from the financial account or the financial record; and receiving the financial transaction card as payment for goods or services, a value of the goods or services being deducted from the financial account or the financial record.

13. The method of claim 12, wherein the displaying the financial transaction card includes providing the article to include a flexible casing having a plurality of cavities defined therein, at least one breakable vial containing a first chemiluminescent component maintained within each of the plurality of cavities, and a second chemiluminescent component maintained in each of the plurality of cavities and configured to chemically react with the first chemiluminescent component when the at least one breakable vial is broken.

14. The method of claim 12, wherein:

the displaying the financial transaction card includes displaying the financial transaction card including an account identifier linked to the financial account or the financial record and fixedly coupled to the enclosure;

the activating the financial transaction card to permit deductions from the financial account or the financial record includes accessing a database storing the financial account or the financial record and activating a financial value tracked via the financial account or the financial record for future use as payment toward goods or services; and the receiving the financial transaction card includes:

using the account identifier to access the database and apply at least a portion of the financial value toward payment for the goods or services, and deducting the value of the goods or services from the financial value tracked via the financial account or the financial record.

15. The method of claim 12, wherein the displaying the financial transaction card includes:

providing the article, the article including:

a flexible casing defining at least one internal cavity, the flexible casing being one of substantially transparent and substantially translucent, and at least one breakable vial enclosed within each cavity, each of the at least one breakable vial containing a first chemiluminescent component, and each cavity containing a second chemiluminescent component; and providing the enclosure to be rigid and one of substantially transparent and substantially translucent such that during the displaying of the financial transaction card, the enclosure and the article including the first chemiluminescent component and the second chemiluminescent component are substantially simultaneously visible when the financial transaction card is viewed from a front of the financial transaction card.

16. The method of claim 15, wherein the at least one internal cavity is a plurality of internal cavities, the at least one breakable vial is a plurality of elongated breakable vials, and the providing the glow article includes:

providing each of the plurality of internal cavities to extend substantially parallel with each other separated by one or more internal walls within the flexible casing;

providing two or more of the plurality of elongated breakable vials in each of the plurality of internal cavities such that each of the plurality of elongated breakable vials extends substantially parallel with the one or more internal walls, and each of the two or more of the plurality of elongated breakable vials in a respective one of the plurality of internal cavities is positioned to allow direct contact with another of the two of or more of the plurality of elongated breakable vials in the respective one of the plurality of internal cavities.

17. The method of claim 12, wherein the displaying the financial transaction card includes displaying the enclosure removably coupled to a backer, wherein the backer is configured to selectively wrap the financial transaction card such that the account identifier of the financial transaction card is accessible through the backer, and the backer interfaces with a supporting structure such that the financial transaction card is supported by the supporting structure via the backer, and the backer, the enclosure, and the article are all visible during the displaying of the financial transaction card.

18. The method of claim 12, further comprising providing the financial transaction card for display, wherein the providing the financial transaction card for display includes:

providing the article separate from the enclosure, providing the enclosure to include a first housing member and a second housing member that are configured to be selectively and repeatedly coupled and uncoupled with one another via a friction fit to selectively enclose the article therebetween, and providing the article removably maintained at least partially within each of the first housing member and the second housing member.

19. The method of claim 18, wherein the providing the enclosure includes providing the enclosure of the financial transaction card to be substantially rectangular and such that the first housing member independently defines a first end of the housing, and the second housing member independently defines a second end of the housing, and the first housing member and the second housing member each define a portion of a side edge of the enclosure extending from the first end to the second end of the enclosure.

20. The method of claim 18, wherein the providing the financial transaction card for display includes providing the second housing member coupled to the first housing member such that the second housing member entirely encompasses a portion of the first housing member.

21. The method of claim 18, wherein providing the financial transaction card for display includes providing the first housing member and the second housing member to each be substantially one of translucent and transparent.

22. The method of claim 21, wherein providing the financial transaction card includes providing a front surface of the enclosure and a first surface of the flexible casing each with a printed graphic such that when the financial transaction card is assembled and displayed, both the printed graphic on the front surface of the enclosure and the printed graphic on the front surface of the flexible casing are simultaneously viewable to provide a three-dimensional visual presentation.

* * * * *